United States Patent [19]

Denisov et al.

[11] 4,412,144
[45] Oct. 25, 1983

[54] SINGLE-PHASE STEP MOTOR

[75] Inventors: Vladimir A. Denisov; Elena F. Kulevskaya; Jury S. Zhiltsov; Olga M. Kuznetsova; Zoya D. Novakovskaya; Vyacheslav I. Kozlov; Vyacheslav K. Korol; Nikolai I. Pershin, all of Moscow, U.S.S.R.

[73] Assignees: Moskovsky Energetichesky Institut; Pervy Moskovsky Cashovoizavod im. S. M. Kirova; V. M. Chasovoi, all of Moscow, U.S.S.R.

[21] Appl. No.: 366,560

[22] Filed: Apr. 8, 1982

[51] Int. Cl.³ .............................................. H02K 37/00
[52] U.S. Cl. ............................ 310/49 R; 310/40 MM; 310/156
[58] Field of Search ............. 310/49 R, 40 MM, 156, 310/162, 163, 164, 42, 83, 254

[56] References Cited

U.S. PATENT DOCUMENTS

| | | | |
|---|---|---|---|
| 3,370,189 | 2/1968 | Haydon et al. | 310/49 R |
| 3,949,251 | 4/1976 | Takatsuki | 310/49 R |
| 4,186,322 | 1/1980 | Besson | 310/49 R |
| 4,205,244 | 5/1980 | Fukushima | 310/40 MM |
| 4,270,066 | 5/1981 | Terade | 310/40 MM |
| 4,342,930 | 8/1982 | Pellaton | 310/40 MM |

Primary Examiner—R. Skudy
Attorney, Agent, or Firm—Burgess, Ryan & Wayne

[57] ABSTRACT

A single-phase step motor comprises a stator having a coil, a core and a plate featuring a hole forming poles of the stator, and a rotor having a permanent magnet and a shaft. The rotor is installed in supports. The poles of the stator, which are magnetically asymmetric, are connected by straps. The rotor and the supports thereof are accommodated inside a capsule made as a body and a cover and placed in the hole of the plate. The capsule is provided with an external cylindrical boss coaxial with the rotor, whereas the body of the capsule is provided with a bearing flange which positions the rotor in relation to the poles of the stator.

5 Claims, 5 Drawing Figures

SINGLE-PHASE STEP MOTOR

FIELD OF THE INVENTION

The invention relates to electrical machines and, in particular, to single-phase step motors extensively employed in discrete electric drives.

BACKGROUND OF THE INVENTION

Known in the art is a single-phase step motor (U.S. Pat. No. 3,370,189, 310-49, 1968) comprising three basic components: a coil with a core, a stator magnetic circuit with a hole and poles which are magnetically asymmetric, and a rotor unit composed of a rotor having a diametrically magnetized permanent magnet and a sleeve made of a non-magnetic material, having two bearings. The rotor unit is accomodated in the hole of the stator magnetic circuit. The non-magnetic sleeve with two bearings protects the rotor against dust. The known single-phase step motor has a magnetic circuit whose design is complex. The rotor is hard to be set with precision in relation to the stator or aligned with an external load mechanism. Such a motor is difficult to assemble.

The closest prototype is a single-phase step motor (British Pat. No. 1,459,981, H2A, 1976) whose design is simpler as contrasted to the one described above. The motor comprises a stator with a coil and a magnetic circuit having a core and a plate with a hole forming poles of the stator, which are magnetically asymmetric and connected by straps, as well as a rotor featuring a diametrically magnetized permanent magnet. The efficiency of this motor is not high because over 20 percent of the working flux of the rotor magnet closes through the straps between the stator poles, which results in reduction of the electromagnetic torque of the known motor. Moreover, no elements for accurate axial setting of the rotor in relation to the stator poles are provided in this motor. The same is true for rotor shaft alignment with respect to any external load mechanism. This makes the motor less reliable.

BRIEF DESCRIPTION OF THE INVENTION

It is an object of this invention to provide a single-phase step motor possessing higher efficiency and reliability.

Another object of this invention is to simplify the assembly of a single-phase step motor.

Still another object of this invention is to ensure maintainability of a single-phase step motor.

The invention essentially resides in that in a single-phase step motor comprising a stator with a coil and a magnetic circuit composed of a core and a plate with a hole forming poles of the stator, which are magnetically asymmetric and connected by straps, as well as a rotor having a diametrically magnetized permanent magnet and supports, according to the invention, the rotor and supports are arranged inside a capsule consisting of a body and a cover and accomodated in the hole of the plate, the capsule being provided with an external cylindrical boss coaxial with the rotor, whereas the body of the capsule has a bearing flange positioning the rotor with respect to the poles of the magnetic circuit of the stator.

It is advisable that the diameter of the body of the capsule is made larger than the diameter of the hole of the plate to size tolerances which permit interference fit of the capsule in the hole of the plate.

It is possible that the bearing flange of the capsule body is a two-step flange.

It is also possible that the cover of the capsule has three steps, one of these steps being fit inside the body of the capsule.

The invention provides a single-phase step motor featuring a single rotor unit, which makes the assembly of the motor easier, the efficiency and reliability of the motor higher, and the motor itself convenient for repairs.

BRIEF DESCRIPTION OF DRAWINGS

The invention will now be described in greater detail with reference to embodiments thereof, which are represented in the accompanying drawings, wherein.

DETAILED DESCRIPTION OF THE INVENTION

Figure 1:
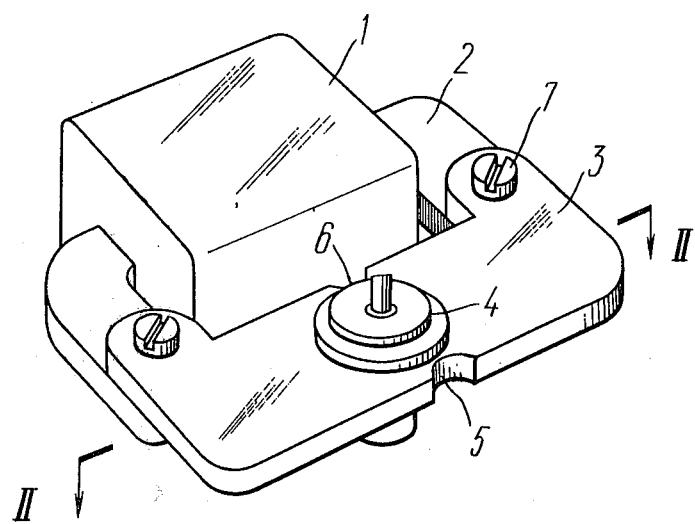
FIG. 1 illustrates a general isometric view of a single-phase step motor, according to the invention.

A single-phase step motor comprises a stator with a coil 1 (FIG. 1) and a magnetic circuit composed of a core 2 and a plate 3 with a hole forming poles of the stator, which are magnetically asymmetric.

A capsule 4 is placed in the hole of the plate 3 between the poles of the stator, which are connected by straps 5 and 6. The core 2 is secured to the plate 3 by screws 7.

Figure 2:
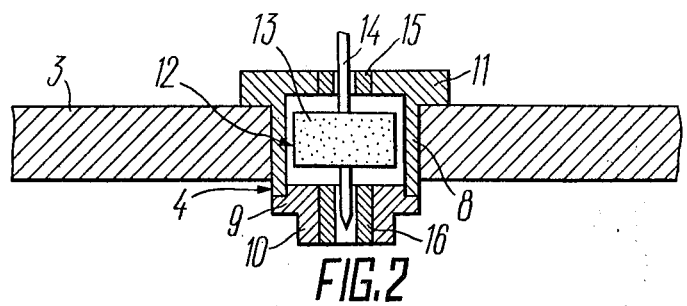
FIG. 2 illustrates a longitudinal section view of FIG. 1 along line II—II for an embodiment where the cylindrical boss of the capsule is made on the cover, according to the invention.

The capsule 4 comprises a body 8 (FIG. 2) and a cover 9. The capsule 4 features an external cylindrical boss 10, whereas the body 8 of the capsule 4 has a bearing flange 11 by which a rotor 12 is positioned in relation to the plate 3. The rotor 12 is equipped with a permanent magnet 14 secured on a shaft 14 and is journalled in lower and upper bearings 15 and 16 secured in the body 8 and the cover 9, respectively.

The diameter of the body 8 can be larger than the diameter of the hole of the plate 3 to size tolerances ensuring interference fit of the capsule 4 in the hole of the plate 3. The straps 5 and 6 (FIG. 1) are stretched, the width of plate 3 in the region thereof, whereas the magnetic resistance is increased. The magnetic flux of the rotor, which closes through the straps 5 and 6, is reduced, thus improving the efficiency of the single-phase step motor of the invention.

The flange 11 ensures high precision of axial setting of the rotor 12 in relation to the plate 3, whereas the boss 10 of the capsule 4 permits precise alignment of the shaft 14 of the rotor 12 in relation to an external load mechanism, which makes the single-phase step motor still more reliable.

Figure 3:
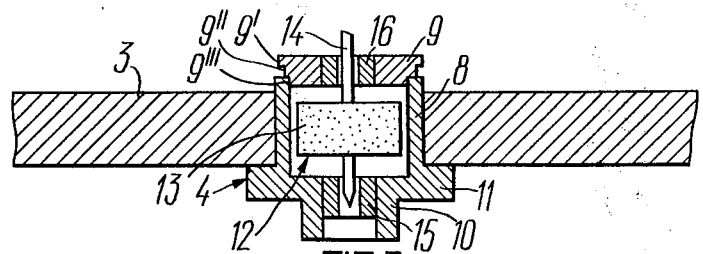
FIG. 3 illustrates an embodiment of a single-phase step motor wherein the cylindrical boss is made on the body of the capsule and the cover has three steps, according to the invention.
Figure 4:
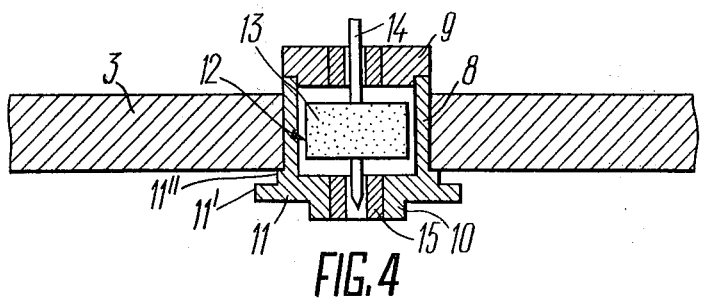
FIG. 4 illustrates an embodiment of a single-phase step motor wherein the bearing flange has two steps, according to the invention.

When the cover 9 (FIG. 3) has three steps 9', 9" and 9''' or when the flange 11 has two steps 11' (FIG. 4) and 11", the single-phase step motor is more convenient for repair since the rotor unit can be stripped.

Figure 5:
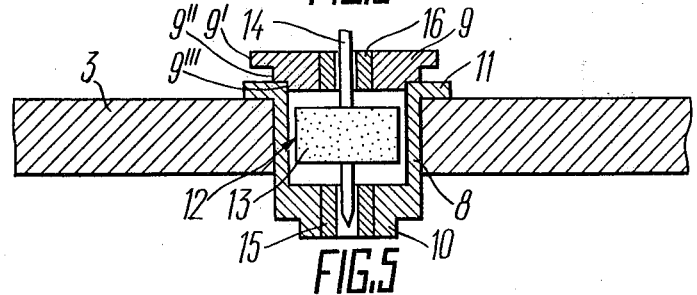
FIG. 5 illustrates an embodiment of a single-phase step motor wherein the bearing flange of the body of the capsule is made at the joint of the body and cover, according to the invention.

Referring to FIG. 5, the capsule 4 has the rotor 12 placed in the hole of the plate 3. The flange 11 of the body 8 is provided at the joint of the body 8 and the cover 9.

The proposed motor operates as follows.

When the coil 1 (FIG. 1) is deenergized, the rotor 12 is set, under the action of the magnetic flux of the permanent magnet 13 (FIG. 2), to a position where the magnetic resistance of the magnetic circuit external to the permanent magnet 13 is minimal, or, in other words, the magnetization axis of the rotor 12 is set at an angle to the magnetic axis of the plate 3. The single-phase step motor is operated by alternating polarity pulses. When the current pulse in the coil 1 (FIG. 1) imparts like polarity to stator poles and the poles of the magnet 13, the rotor 12 is subjected to the torque pushing it in the shortest way possible to a position wherein the magnetic axes of the rotor and stator coincide. When the current pulse is over, the rotor 12 is pushed by the magnetic flux of the magnet 13 to a position diametrically opposite to the initial position. With the next pulse of the opposite polarity, the process is repeated and the rotor 12 makes a full revolution, thus completing the full operational cycle.

Interference fit of the capsule 4 with the boss 10 (FIG. 2) and the flange 11 into the hole of the plate 3 significantly increases the efficiency of the motor, reduces the number of assembly units. Moreover, the assembly and checking of the rotor unit can be done independently without the stator, the rotor 12 is much simplier to position in relation to the poles of the stator and outside dust cannot get into rotating components of the rotor 12. All this makes the assembly of the motor simpler, its reliability higher and the motor itself more convenient for repair.

What is claimed is:

1. A single-phase stepping motor, comprising:
    a stator;
    a coil of said stator;
    a magnetic circuit of said stator;
    a core of said magnetic circuit;
    a plate of said magnetic circuit having a hole;
    poles of said stator which are magnetically asymmetric and formed by said hole of said plate;
    straps interconnecting said poles of said stator;
    a rotor;
    a shaft of said rotor;
    a diametrically magnetized permanent magnet of said rotor;
    first and second supports of said shaft of said rotor;
    a capsule set in said hole of said plate;
    a cover of said capsule;
        a body of said capsule having a diameter exceeding the diameter of said hole in said plate by an amount equal to tolerances ensuring interference fit of said capsule in said hole in said plate;
        a portion of said body disposed against said cover;
        the first support of said shaft of said rotor being arranged in said cover of said capsule;
        the second support of said shaft of said rotor being arranged in said portion of said body;
        an external cylindrical boss of said capsule, coaxial with said rotor;
        a bearing flange of said body of said capsule, which positions said rotor with respect to said poles of said stator.

2. A single-phase step motor as claimed in claim 1, comprising:
    bearing flange of said body of said capsule having two steps.

3. A single-phase stepping motor as claimed in claim 1, comprising:
    three steps of said cover;
    one step of said three steps of said cover being fitted into said body of said capsule.

4. A single-phase step motor as claimed in claim 2, comprising:
    three steps of said cover;
    one step of said three steps being fitted into said body of said capsule.

5. A single phase stepping motor, comprising:
    a magnetic circuit path comprising a magneticially permeable core, an electromagnetic surrounding at least a portion of said core, a magnetically permeable plate extending between the ends of said core, said plate having a narrowed portion, and a cylindrical rotor capsule disposed in a hole in said narrowed portion of said plate, said capsule having an axis extending perpendicular to said plate at said narrowed portion thereof, the portion of said plate adjacent said hole forming magnetically asymmetric poles on diametrically opposite sides of said capsule, said magnetic circuit having increased reluctance at said narrowed portion of said plate, said capsule comprising:
    a hollow cylindrical body having an interference fit in said hole, said body having a circumferential flange engaging a surface of said plate, one end of said body forming a coaxial circumferential boss,
    a first coaxial bearing installed in a hole in said body adjacent said boss,
    a cover secured to and substantially enclosing the other end of said body,
    a second coaxial bearing installed in a hole in said cover,
    a coaxial shaft rotatably mounted in said bearings, and
    a rotor secured to said shaft and disposed between said bearings, said rotor being disposed between said poles in said magnetic circuit path and comprising a magnetic material permanently magnetized in a direction radial to said shaft,
    whereby said rotor is caused to rotate when an electrical control signal is applied to said electromagnet, said flange insuring accurate alignment of the rotor with respect to said poles.

* * * * *